United States Patent
Sakamoto et al.

(10) Patent No.: US 7,426,288 B2
(45) Date of Patent: Sep. 16, 2008

(54) INFORMATION PROCESSING APPARATUS AND SIGNATURE DATA INPUT PROGRAMS

(75) Inventors: Kei Sakamoto, Hamura (JP); Yojiro Tonouchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 910 days.

(21) Appl. No.: 10/958,369

(22) Filed: Oct. 6, 2004

(65) Prior Publication Data

US 2005/0105781 A1 May 19, 2005

(30) Foreign Application Priority Data

Nov. 14, 2003 (JP) ............................. 2003-385430

(51) Int. Cl.
*G06K 9/00* (2006.01)
(52) U.S. Cl. .................. 382/119; 382/120; 382/187
(58) Field of Classification Search ............. 382/119, 382/120, 187; 348/161; 73/865.4
See application file for complete search history.

(56) References Cited

U.S. PATENT DOCUMENTS

| | | | |
|---|---|---|---|
| 5,347,589 A * | 9/1994 | Meeks et al. ............. | 382/119 |
| 5,699,445 A * | 12/1997 | Wagner et al. .......... | 382/119 |
| 5,802,200 A * | 9/1998 | Wirtz ..................... | 382/119 |
| 6,118,889 A | 9/2000 | Izuno et al. | |
| 6,486,874 B1 | 11/2002 | Muthuswamy et al. | |
| 7,239,727 B2 * | 7/2007 | Taylor .................... | 382/119 |

FOREIGN PATENT DOCUMENTS

| | | |
|---|---|---|
| EP | 0 427 562 A1 | 5/1991 |
| EP | 0 858 052 A1 | 8/1998 |
| EP | 0 944 020 A2 | 9/1999 |
| JP | 2736083 | 1/1998 |

OTHER PUBLICATIONS

European Search Report dated Feb. 22, 2006 for Appln. No. 04022545.0-2218.

* cited by examiner

*Primary Examiner*—Bhavesh Mehta
*Assistant Examiner*—John B Strege
(74) *Attorney, Agent, or Firm*—Pillsbury Winthrop Shaw Pittman, LLP

(57) ABSTRACT

An apparatus includes an input device which inputs coordinate data and pressure data corresponding to a signature which is handwritten by a stylus, a unit for sensing a completion of input of a handwritten signature, a unit for detecting an actual stroke end point, a unit for extracting a given number of items of coordinate data input after the actual stroke end point, as effective air stroke data, from the coordinate data and pressure data both input during a period of time from the actual stroke end point to sensing of the completion of input of the handwritten signature, and a unit for defining, as signature data corresponding to the handwritten signature, the coordinate data and the pressure data both input during a period of time from a signature input start point to the actual stroke end point and the coordinate data extracted as the effective air stroke data.

18 Claims, 8 Drawing Sheets

US 7,426,288 B2

INFORMATION PROCESSING APPARATUS AND SIGNATURE DATA INPUT PROGRAMS

CROSS-REFERENCE TO RELATED APPLICATIONS

This application is based upon and claims the benefit of priority from prior Japanese Patent Applications No. 2003-385430, filed Nov. 14, 2003, the entire contents of which are incorporated herein by reference.

BACKGROUND OF THE INVENTION

1. Field of the Invention

The present invention relates to an information processing apparatus for inputting signature data corresponding to a handwritten signature, and programs for doing the same.

2. Description of the Related Art

Attention has recently been attracted to signature verification technology. This technology is to perform a verification process using electronic signature data corresponding to a handwritten signature. Using the signature verification technology, a verification process of identifying or recognizing an individual can be carried out with efficiency.

The verification technology requires a function of inputting signature data indicative of the characteristics (or trait) of a handwritten signature.

Japanese Patent No. 2736083 discloses a method of inputting a signature from its start point to its final actual stroke as effective signature data. In this method, both a string of coordinate data items and that of pressure (or pen pressure) data items between the start point and the final actual stroke are considered to be effective signature data. On the other hand, a string of coordinate data items and that of pressure data items, which are input after the end point of the final actual stroke, are all considered to be noise and thus canceled.

In order to achieve high-accuracy signature verification, however, a larger number of trait data items need to be acquired as signature data from a handwritten signature. A new technology of determining a range of effective signature data based on a handwritten signature is required.

BRIEF SUMMARY OF THE INVENTION

According to an embodiment of the present invention, there is provided an information processing apparatus comprising: an input device which inputs coordinate data and pressure data corresponding to a signature which is handwritten by a stylus; a determining unit configured to determine whether the stylus lifts off the input device, based on the pressure data input by the input device; a sensing unit configured to sense a completion of input of a handwritten signature when a lift-off state of the stylus continues for a given period of time; a detecting unit configured to detect an actual stroke end point at which the stylus contacts the input device last, when the completion of input of the handwritten signature is sensed; an extracting unit configured to extract a given number of items of coordinate data input after the actual stroke end point, as effective air stroke data after the actual stroke end point, from the coordinate data and pressure data both input during a period of time from the actual stroke end point to sensing of the completion of input of the handwritten signature; and a defining unit configured to defines, as signature data corresponding to the handwritten signature, the coordinate data and the pressure data both input during a period of time from a signature input start point at which the stylus contacts the input device first to the actual stroke end point and the coordinate data extracted as the effective air stroke data.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described with reference to the accompanying drawings.

Figure 1:
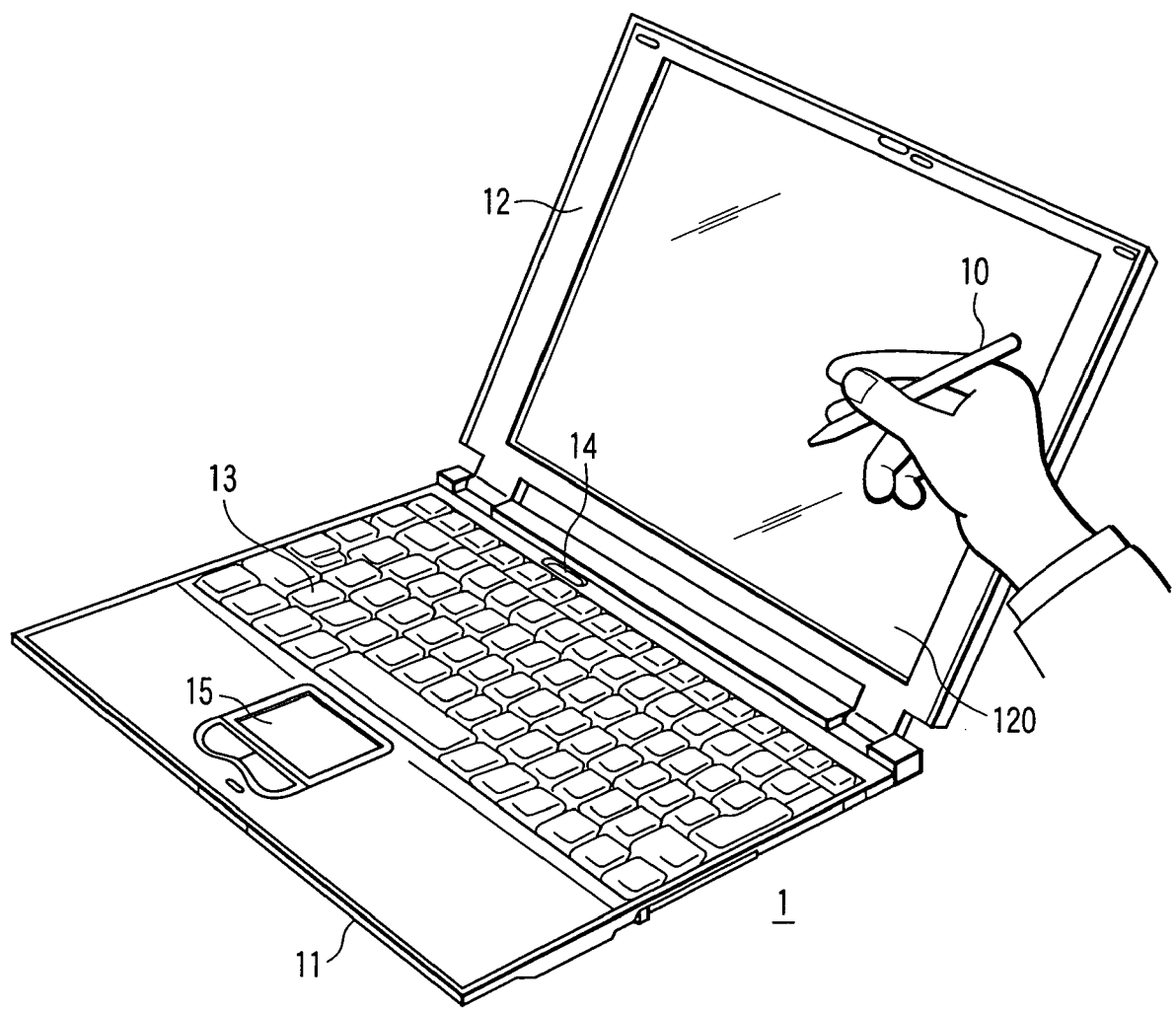
FIG. 1 is a perspective view showing an outward appearance of a computer according to an embodiment of the present invention.
Figure 2:
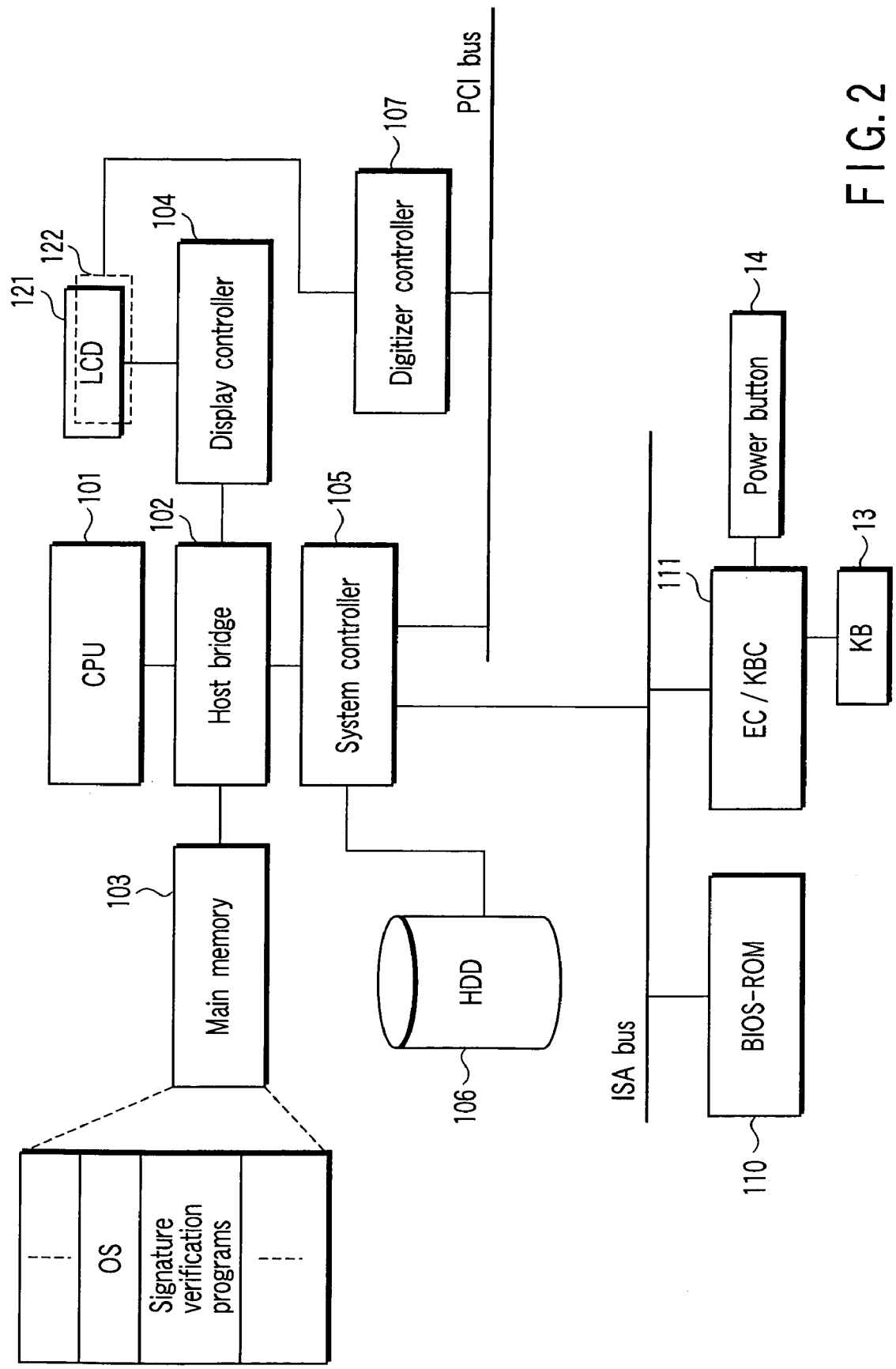
FIG. 2 is a block diagram of a system configuration of the computer shown in FIG. 1.

Referring first to FIGS. 1 and 2, the configuration of an information processing apparatus according an embodiment of the present invention will be described. The information processing apparatus is implemented as, for example, a notebook personal computer.

FIG. 1 is perspective view of the notebook personal computer that is open. The computer shown in FIG. 1 is a so-called tablet personal computer 1 including a computer main body 11 and a display unit 12. The display unit 12 incorporates a display device 120. The display screen of the display device 120 is located in almost the central part of the display unit 12.

The display device 120 is a touch screen device (tablet) that is configured to sense a position designated by the tip of a stylus (pen) 10. The display device 120 includes a liquid crystal display (LCD) and a digitizer. The digitizer is an input device to sense a position designated by the tip of the stylus 10 and then input coordinate data corresponding to the position and pressure (pen pressure or stylus pressure) data in the position. For example, an electromagnetic induction type digitizer can be used.

In the present embodiment, the digitizer is able to sense coordinate data and pressure data corresponding to a position designated by the tip of the stylus 10 even though the tip is not in contact with the surface of the display device 120. The pressure data indicates the pressure of the tip of the stylus 10 that is applied to the surface of the display device 120. No pressure is caused when the tip of the stylus 10 does not contact the surface of the display device 120 or the stylus 10 lifts off, but a given pressure is done when the tip contacts the surface. For example, the digitizer is able to sense a value of the pressure according to variations in the phase of electromagnetic signals output from the tip of the stylus 10. The phase of the electromagnetic signals is varied by, e.g., a pressure sensor included in the stylus 10.

The display unit 12 is attached to the main body 11 rotatably between an open position and a closed position. The main body 11 is a thin, box-type housing and has a keyboard 13, a power button 14 for turning on/turning off the computer 1 and a touch pad 15 thereon.

Referring next to FIG. 2, the system configuration of the computer 1 will be described.

The computer 1 includes a CPU (Central Processing Unit) 101, a host bridge 102, a main memory 103, a display controller 104, a system controller 105, a hard disk driver (HDD) 106, a digitizer controller 107, a BIOS-ROM 110 and an embedded controller/keyboard controller IC (EC/KBC) 111.

The CPU 101 is a processor to control the operation of the computer 1 and executes the operating system (OS) and various application/utility programs which are loaded into the main memory 103 from the HDD 106. The CPU 101 also executes the basic input output system (BIOS) stored in the BIOS-ROM 110.

A signature verification program is installed in advance in the computer 1 as one utility program. This signature verification program is one for confirming the identity of a computer user based on a user's handwritten signature (a user's own signature) with the stylus 10. The signature verification program is used to, for example, identify a user who logs on to the computer 1.

The signature verification program has a signature data input function of inputting electronic signature data corresponding to a user's handwritten signature. The signature data represents the characteristics (or trait) of the handwritten signature and is formed of, e.g., three-dimensional (X coordinate, Y coordinate and pressure) time-series data. The signature verification program also has a signature enrollment function and a signature verification function.

The signature enrollment function is a function of registering signature data input by the signature data input function into the computer 1. The signature verification function is used to identify a user who logs on to the computer 1. The signature verification function compares signature data input by the signature input function and signature data registered in the computer 1 to determine whether the user's handwritten signature is valid or not.

As described above, the signature data input function is used to register user's signature data into the computer 1 and identify a user who logs on to the computer 1.

In the present embodiment, data indicative of air stroke (off-tablet motion) immediately after the final actual stroke is used as signature data in order to determine whether the handwritten signature is a valid one or an invalid one given by a malicious third party. The air stroke indicates the movement (track in air) of the stylus 10 in the air immediately after the final actual stroke.

The host bridge 102 is a bridge device that connects the local bus of the CPU 101 and the system controller 105. The host bridge 102 includes a memory controller that controls access to the main memory 103. The display controller 104 controls an LCD 121 that serves as a display monitor of the computer 1.

The system controller 105 controls devices on a PCI (Peripheral Component Interconnect) bus and those on an ISA (Industry Standard Architecture) bus. The system controller 105 includes an IDE (Integrated Drive Electronics) controller to control the HDD 106.

The digitizer controller 107 is a device that controls a digitizer 122. The digitizer controller 107 acquires both coordinate data and pressure data from the digitizer 122. The digitizer 122 is implemented as, for example, a transparent board placed on the LCD 121.

The EC/KBC 111 is a one-chip microcomputer in which an embedded controller for power management and a keyboard controller for controlling the keyboard (KB) 13 are integrated. The EC/KBC 111 has a function of powering on/off the computer 1 in accordance with a user's operation of the power button 14.

Figure 3:
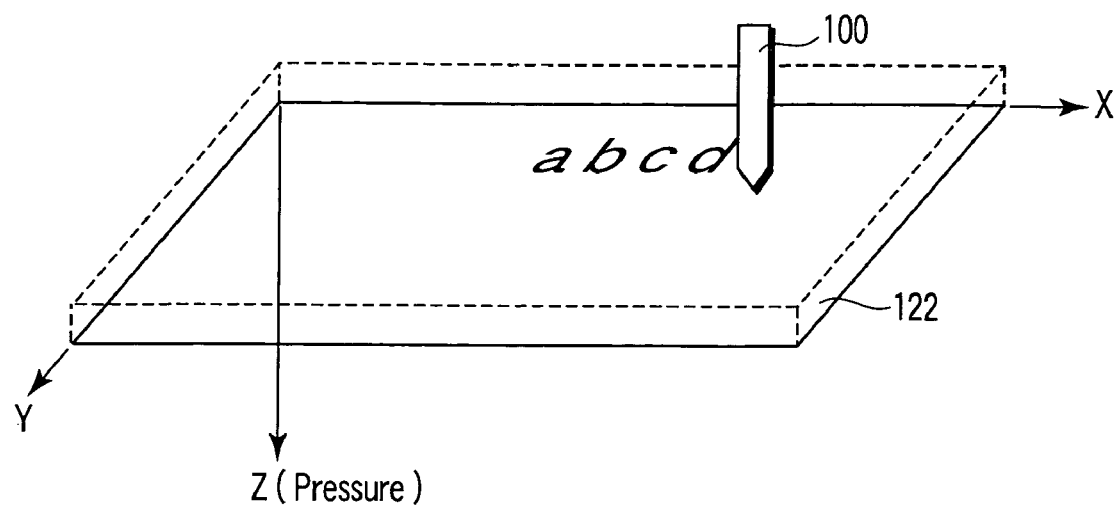
FIG. 3 is an illustration of an effective area of a digitizer provided in the computer shown in FIG. 1.

An effective area within which the digitizer 122 can sense a position of the tip of the stylus 10 will be described with reference to FIG. 3.

The digitizer 122 has an input surface that is flush with the surface of the display device 120. In FIG. 3, the area (space) circled by the broken line represents an effective area within which the digitizer 122 can sense a position of the tip of the stylus 10. The digitizer 122 outputs three-dimensional coordinate data (X, Y and Z) corresponding to a position on the input surface, which is indicated by the tip of the stylus 10. Z indicates the (pen) pressure described above. In the present embodiment, the following conditions are defined:

(1) $Z \leqq 0$: The pressure is applied.

(2) $Z > 0$: No pressure is applied.

In condition (1), the tip of the stylus 10 is in contact with the input surface of the digitizer 122. The movement (actual stroke) of the tip in this condition is displayed on the display device 120 as handwriting.

In condition (2), the tip of the stylus 10 lifts off the input surface of the digitizer 122. If the tip is present within the effective area even in this condition, its movement (air stroke) is sensed by the digitizer 122 and not displayed on the display device 120 as handwriting.

When the input of the handwritten signature is started, the digitizer 122 inputs coordinate data (X, Y) and pressure data (Z) corresponding to the signature which is handwritten by the stylus.

Figure 4:
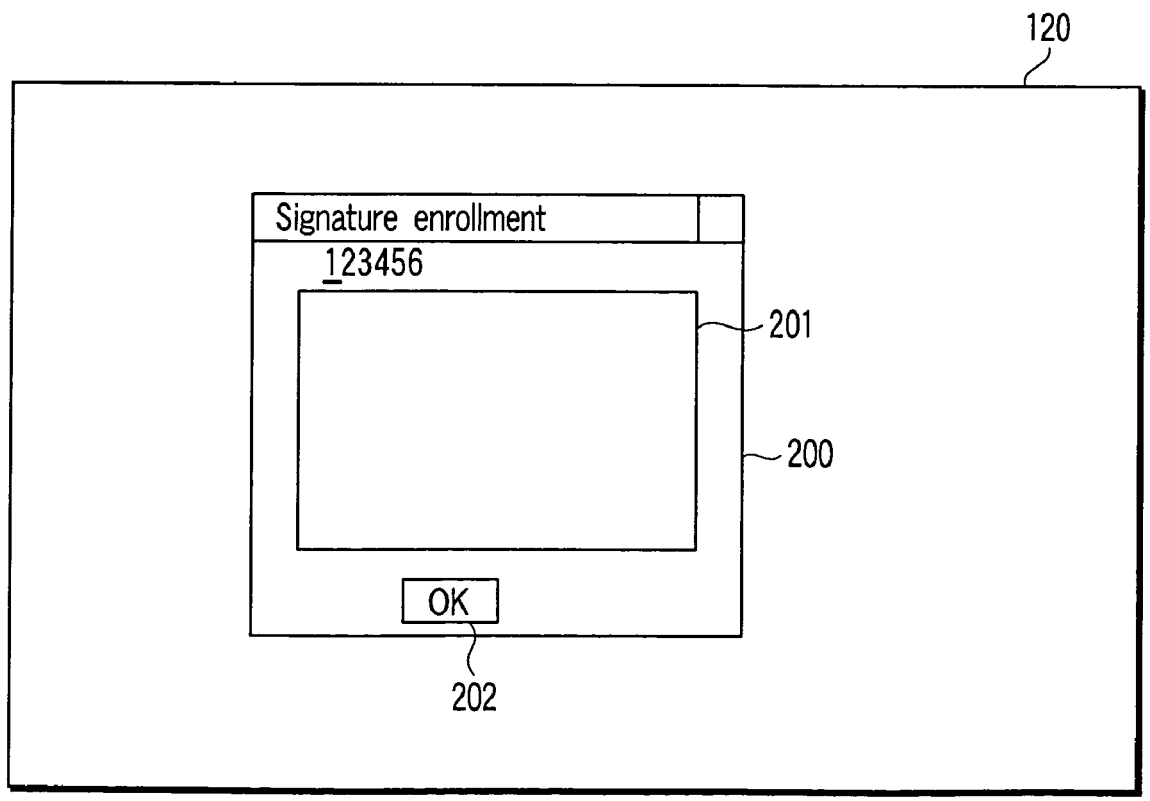
FIG. 4 is a diagram showing an example of a signature enrollment screen used in the computer shown in FIG. 1.

FIG. 4 shows an example of a signature enrollment screen displayed by the signature verification program. When a user requests his or her own signature enrollment, the signature verification program displays a signature enrollment screen 200 on the display device 120 as shown in FIG. 4.

The signature enrollment screen 200 displays a handwriting input area 201 and an "OK" button 202. The handwriting input area 201 is an area in which the user handwrites his or her signature with the stylus 10. The "OK" button 202 is a button to input data indicating that the input of the handwritten signature is completed. In the signature enrollment, the user inputs the signature a plurality of times (e.g. six signatures).

The signature verification program determines that the input of the handwritten signature is completed when the user depresses the "OK" button 202 or the program senses, after the input of the handwritten signatures is started, that a lift-off state of the stylus 10 continues longer than a given period of time. The signature verification program generates signature data from the input six signatures. This signature data is to be stored in the computer 1.

Figure 5:
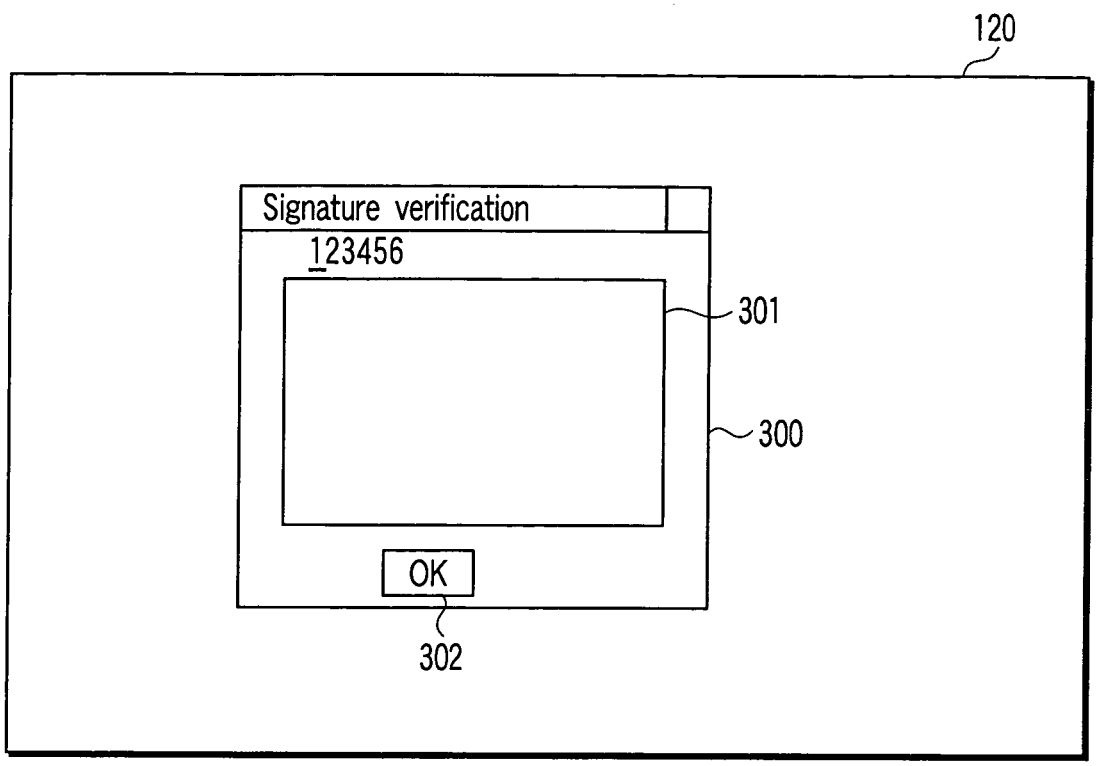
FIG. 5 is a diagram showing an example of a signature verification screen used in the computer shown in FIG. 1.

FIG. 5 shows an example of a signature verification screen displayed by the signature verification program. The signature verification program displays a signature verification screen 300 on the display device 120 when the computer 1 starts up or a user who logs on the computer is changed, as shown in FIG. 5. The signature verification screen 300 displays a handwriting input area 301 and an "OK" button 302. The handwriting input area 301 is an area in which a user writes his or her signature with the stylus 10. The "OK" button 302 is a button to input data indicating that the input of the handwritten signature is completed.

The signature verification program determines that the input of the handwritten signature is completed when the user depresses the "OK" button 302 or the program senses that a lift-off state of the stylus 10 continues longer than a given period of time after the handwritten signature starts to be input. The signature verification program compares signature data corresponding to the input handwritten signature and signature data enrolled in the computer 1 and determines whether the input handwritten signature is valid or not. In other words, the handwritten signature is utilized in place of a password.

Figure 6:
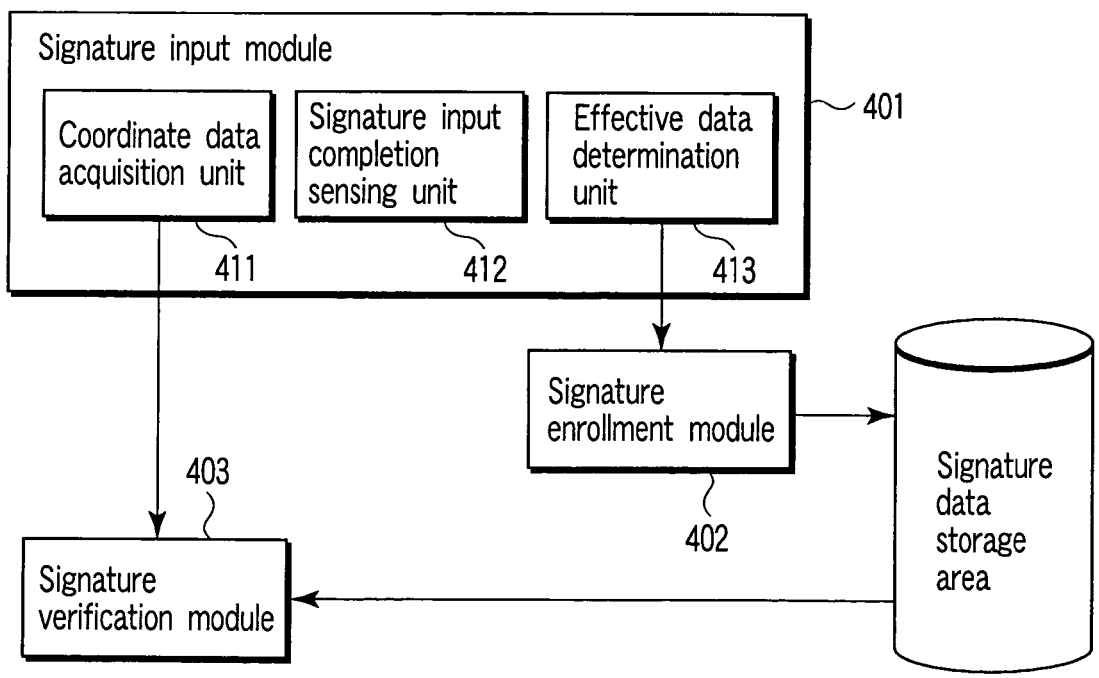
FIG. 6 is a block diagram of the structure of a signature verification program used in the computer shown in FIG. 1.

FIG. 6 shows an example of a module structure of the signature verification program.

The signature verification program includes a signature input module 401, a signature enrollment module 402 and a signature verification module 403, as shown in FIG. 6.

The signature input module 401 carries out the signature input operation described above. The signature enrollment module 402 and signature verification module 403 carry out their respective signature enrollment operation and signature verification operation described above. The signature input module 401 has a coordinate data acquisition unit 411, a signature input completion sensing unit 412 and an effective data determination unit 413.

The coordinate data acquisition unit 411 acquires coordinate data (X, Y) and pressure data (Z) in sequence from the digitizer 122 at a given sampling rate. The sampling rate is, for example, 133/sec. Thus, 133 items of sampling data are acquired per second. Each of the items of sampling data contains coordinate data (X, Y) and pressure data (Z).

The signature input completion sensing unit 412 performs the following operations in order to sense that the input of a handwritten signature is completed:

(1) The unit 412 determines whether the stylus 20 lifts off the input surface of the digitizer 122 based on the time-series data of pressure data (Z) acquired by the coordinate data acquisition unit 411.

(2) The unit 412 counts a time period during which the stylus 20 lifts off, based on the time-series data of pressure data (Z).

(3) The unit 412 senses that the input of a handwritten signature is completed when the stylus 10 continues to lift off the input surface of the digitizer 122 for a give period of time.

The effective data determination unit 413 determines a range of effective data to be used as signature data from the time-series data of each of coordinate data (X, Y) and pressure data (Z) acquired by the coordinate data acquisition unit 411. In order to determine the range of effective data, the unit 413 performs the following operations:

(1) When the completion of the input of a handwritten signature is sensed, the unit 413 determines an actual stroke end point at which the stylus 10 contacts the input surface of the digitizer 122 last, based on the time-series data of the acquired pressure data (Z). The end point is an end point of the final actual stroke.

(2) The unit 413 extracts a given number of items of three-dimensional time-series data (X, Y, Z) acquired after the end point of the final actual stroke, from three-dimensional time-series data (X, Y, Z), which are acquired during a time period from the end point of the final actual stroke to the sensing of the completion of the input of the handwritten signature, as effective air stroke data after the end point of the final actual stroke. Some items of three-dimensional time-series data (X, Y, Z) immediately after the final actual stroke end point represent a movement (or track) of the stylus 10 in the air immediately after the final actual stroke. This track can be used as effective information indicating the trait of the signature, like the actual stroke. The number of time-series data items extracted as effective air stroke data has only to be, for example, about four. At the sampling rate of 133/sec., some items of three-dimensional time-series data (X, Y, Z) obtained during a time period of 4/133 second immediately after the completion of the final actual stroke are considered to be effective air stroke data.

(3) The unit 413 determines, as effective signature data, the three-dimensional time-series data (X, Y, Z) obtained from the signature input start point to the actual stroke end point and the given number of items of three-dimensional time-series data (X, Y, Z) extracted as effective air stroke data.

Figure 7:
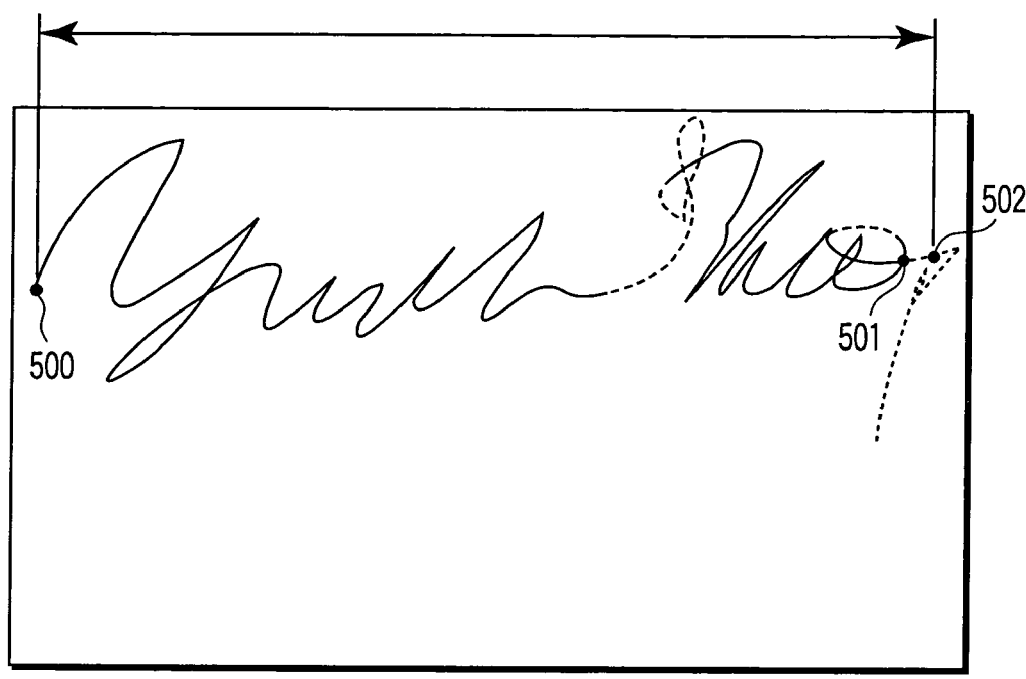
FIG. 7 is a diagram showing an example of a signature input to the computer shown in FIG. 1.

FIG. 7 shows an example of a user's handwritten signature. This signature is handwritten by a user named Yuichiro Kato.

In FIG. 7, a solid line indicates an actual stroke, and a broken line indicates an air stroke.

Reference numeral 500 denotes a point at which the stylus 10 contacts the surface of the digitizer 122 first, or a signature input start point. Reference numeral 501 indicates a point at which the stylus 10 contacts the surface of the digitizer 122 last, or the end point of the final actual stroke. Numeral 502 shows a point corresponding to the point in time when 4/133 second elapses after the end point 501.

In the present embodiment, not only the three-dimensional time-series data (X, Y, Z) acquired from the signature input start point 500 to the end point 501 of the final actual stroke, but also some items of three-dimensional time-series data (X, Y, Z) acquired from the end point 501 of the final actual stroke to the point indicated by reference numeral 502 are used as signature data.

Figure 8:
FIG. 8 is a chart showing an example of time-series data of pressure of the signature input to the computer shown in FIG. 1.

FIG. 8 shows an example of time-series data on pressure (Z) obtained when a handwritten signature is input.

The signature verification program senses that the input of the handwritten signature starts when Z becomes zero or lower (timing t1) first after the acquisition of time-series data (X, Y, Z) starts. After that, the signature verification program determines that the input of the handwritten signature is completed when a time period during (Z>0) which the stylus 10 lifts off exceeds a threshold value T. Sensing the completion of the input of the handwritten signature, the signature verification program determines time-series data (X, Y, Z) obtained during a time period of $T\alpha$ elapsed after the point in time when the final actual stroke is completed (timing t2), as effective air stroke data immediately after the final actual stroke.

Figure 9:
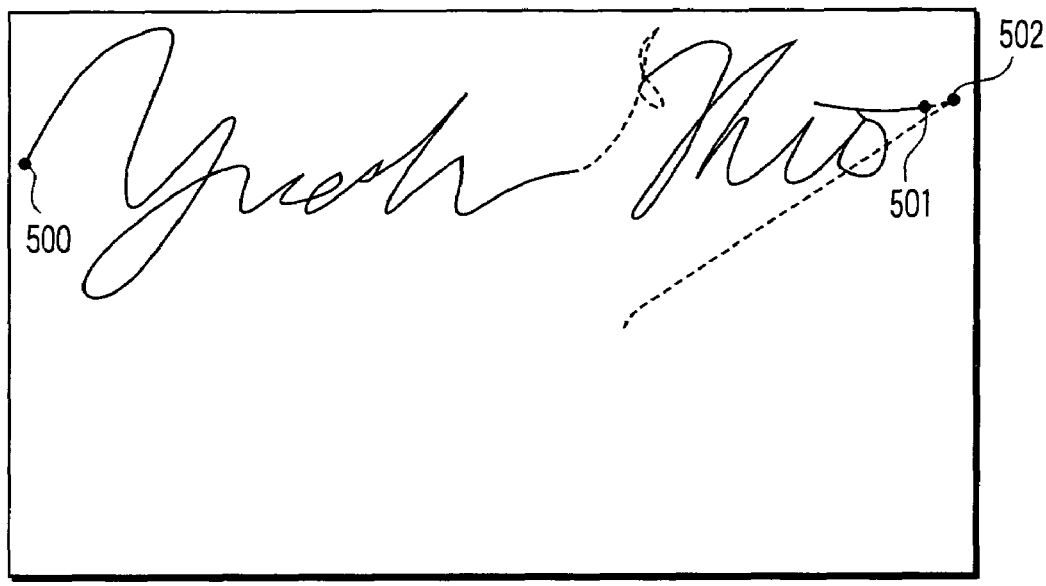
FIG. 9 is a diagram showing another example of a signature input to the computer shown in FIG. 1.
Figure 10:
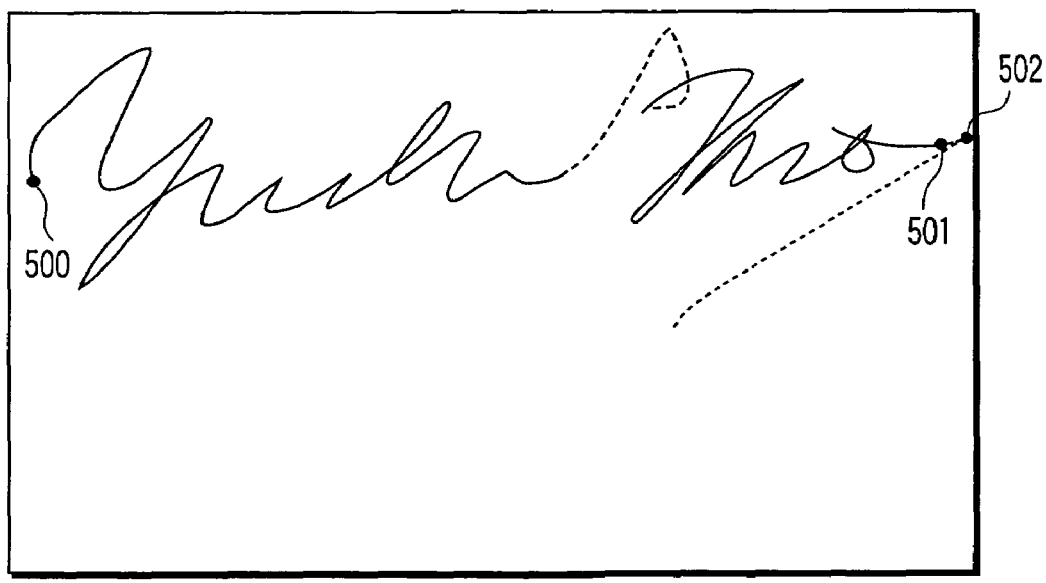
FIG. 10 is a diagram showing still another example of a signature input to the computer shown in FIG. 1.

FIGS. 9 and 10 each show another example of the signature handwritten by the same user named Yuichiro Kato as that in FIG. 7.

As is apparent from FIGS. 7, 9 and 10, the signatures differ in handwriting of the actual stroke, but they are very similar in air stroke (between numerals 501 and 502) immediately after the final actual stroke. Therefore, not only a string of coordinate data items (X, Y) and that of pressure data items (Z) acquired from the signature input start point to the final actual stroke end point, but also a given number of coordinate data items (X, Y) and pressure data items (Z) acquired after the final actual stroke end point are determined as signature data. More characteristic data items can thus efficiently be obtained from the handwritten signature as signature data.

A procedure of a signature input operation performed by the signature verification program will be described with reference to the flowchart shown in FIG. 11. As described above, the signature input operation is done using the signature enrollment screen 200 shown in FIG. 4 or the signature verification screen 300 shown in FIG. 5. Hereinafter, the coordinate data (X, Y) and pressure data (Z) are represented together as coordinate data (X, Y, Z). The CPU 101 executes the signature input module 401 of the signature verification program and thus performs the signature input operation in the following steps.

The CPU 101 sets a variable n indicating the number of samplings to zero and then acquires coordinate data {X(n), Y(n), Z(n)} from the digitizer 122 (step S101). The CPU 101 determines whether the tip of the stylus 10 is present within the effective area of the digitizer 122 according to whether the coordinate data {X(n), Y(n), Z(n)} can correctly be acquired or not (step S102). If the tip of the stylus 10 is present within the effective area (YES in step S102), the CPU 101 determines whether Z(0) of the coordinate data {X(n), Y(n), Z(n)} acquired in step S101 is equal to or smaller than zero in order to determine whether the tip of the stylus 10 contacts the digitizer 122 (step S103).

If Z(0) is larger than zero (NO in step S103), the CPU 101 acquires the subsequent coordinate data {X(n), Y(n), Z(n)} from the digitizer 122 while maintaining the variable n at zero (step S101) and then carries out the operations in the steps S102 and S103 described above.

If Z(0) is equal to or smaller than zero (YES in step S103), the CPU 101 determines that the tip of the stylus 10 contacts the digitizer 122. The coordinate data {X(0), Y(0), Z(0)} represents a signature input start point.

When the variable n becomes equal to one (step S104), the CPU 101 acquires the subsequent coordinate data {X(n), Y(n), Z(n)} from the digitizer 122 (step S105). The CPU 101 determines whether Z(n) of the coordinate data {X(n), Y(n), Z(n)} is larger than zero (step S106) in order to determine whether the tip of the stylus 10 lifts off the input surface of the digitizer 122 (step S106).

If Z(n) is equal to or smaller than zero (NO in step S106), or if the tip of the stylus 10 contacts the surface of the digitizer 122, the CPU 101 updates the variable n by +1 (step S107) and then acquires the subsequent coordinate data {X(n), Y(n), Z(n)} from the digitizer 122 (step S105).

If Z(n) is larger than zero (YES in step S106), the CPU 101 determines that the tip of the stylus 10 lifts off the surface of the digitizer 122. Then, the CPU 101 resets the value t of a watchdog timer to zero to measure a lift-off duration of the stylus 10 (step S108). The watchdog timer can be implemented by either hardware or software. The CPU 101 acquires the subsequent coordinate data {X(n+k), Y(n+k), X(n+k)} from the digitizer 122 (step S109), where k indicates the number of samplings during a period of time when the stylus 10 lifts off. The initial value of k is one. The CPU 101 determines that Z(n+k) of the coordinate data {X(n+k), Y(n+k), X(n+k)} is larger than zero or not (step S110).

If Z(n+k) is equal to or smaller than zero (NO in step S110), or if the tip of the stylus 10 contacts the surface of the digitizer 122 again, the CPU 101 updates the variable n to n+k+1 (step S107) and then acquires the subsequent coordinate data {X(n), Y(n), Z(n)} from the digitizer 122 (step S105). After that, the CPU 101 advances to step S106.

If Z(n+k) is larger than zero (YES in step S110), or if the tip of the stylus 10 lifts off the surface of the digitizer 122, the CPU 101 updates the value t of the watchdog timer by +1 (step S111). Then, the CPU 101 determines whether the value t exceeds a threshold value T (step S112). If the value t does not exceed the threshold value T (NO in step S112), the CPU 101 updates the value k by +1 (step S113) and advances to step S109.

If the value t of the watchdog timer exceeds the threshold value T (step S112), the CPU 101 determines that the input of a handwritten signature is completed and performs an operation of determining effective data (step S114). In step S114, the CPU 101 determines the current value of n as the final actual stroke end point. Needless to say, the value of n corresponding to the final actual scroll end point can be determined by searching time-series data items of Z in sequence from their last one. The CPU 101 extracts a string of coordinate-data {X, Y, Z (n=n+1 to n+α)}, as effective air stroke data, from a string of coordinate-data {X, Y, Z (n=n+1 to n+k)} acquired after the final actual stroke end point. The value of α is, for example, 4 as described above. The threshold value T is considerably larger than α. Then, the CPU 101 adds the effective air stroke data {X, Y, Z (n=n+1 to n+α)} to a string of coordinate-data {X, Y, Z (n=0 to n)} acquired from the signature input start point to the final actual stroke end point to define effective signature data {X, Y, Z (n=0 to n+α)}.

The effective air stroke data need not always include pressure data but can be structured by {X, Y (n=N+1 to n+α)}.

Figure 11:
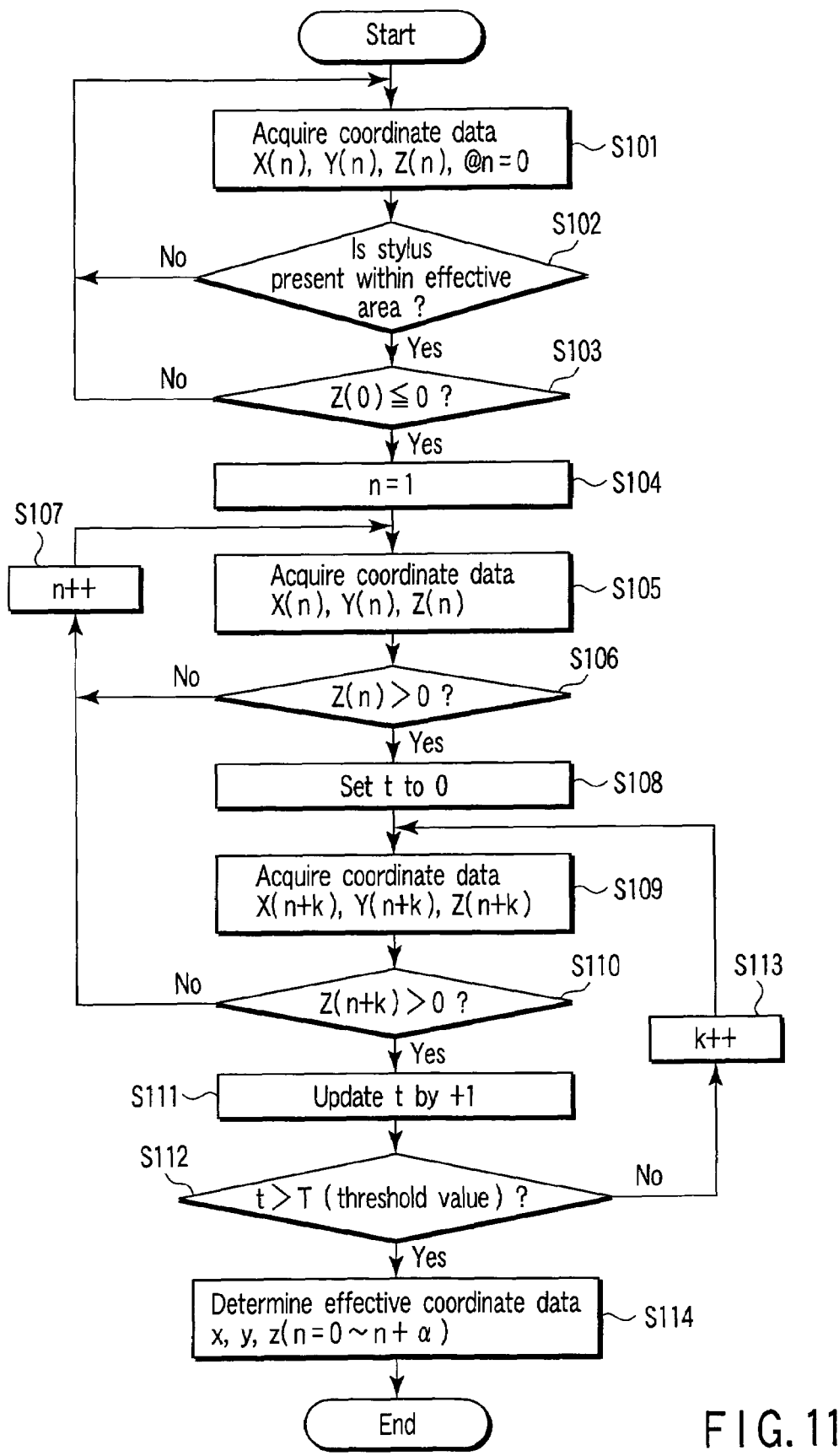
FIG. 11 is a flowchart showing a procedure of a signature input operation performed by the computer shown in FIG. 1.

In the flowchart shown in FIG. 11, the CPU 101 determines whether the input of a handwritten signature is completed based on the lift-off duration of the stylus 10. However, the CPU 101 can determine that the input of a handwritten signature is completed when the "OK" button is depressed as described with reference to FIGS. 4 and 5. In this case, the signature input operation can be performed in the steps shown in FIG. 12.

Figure 12:
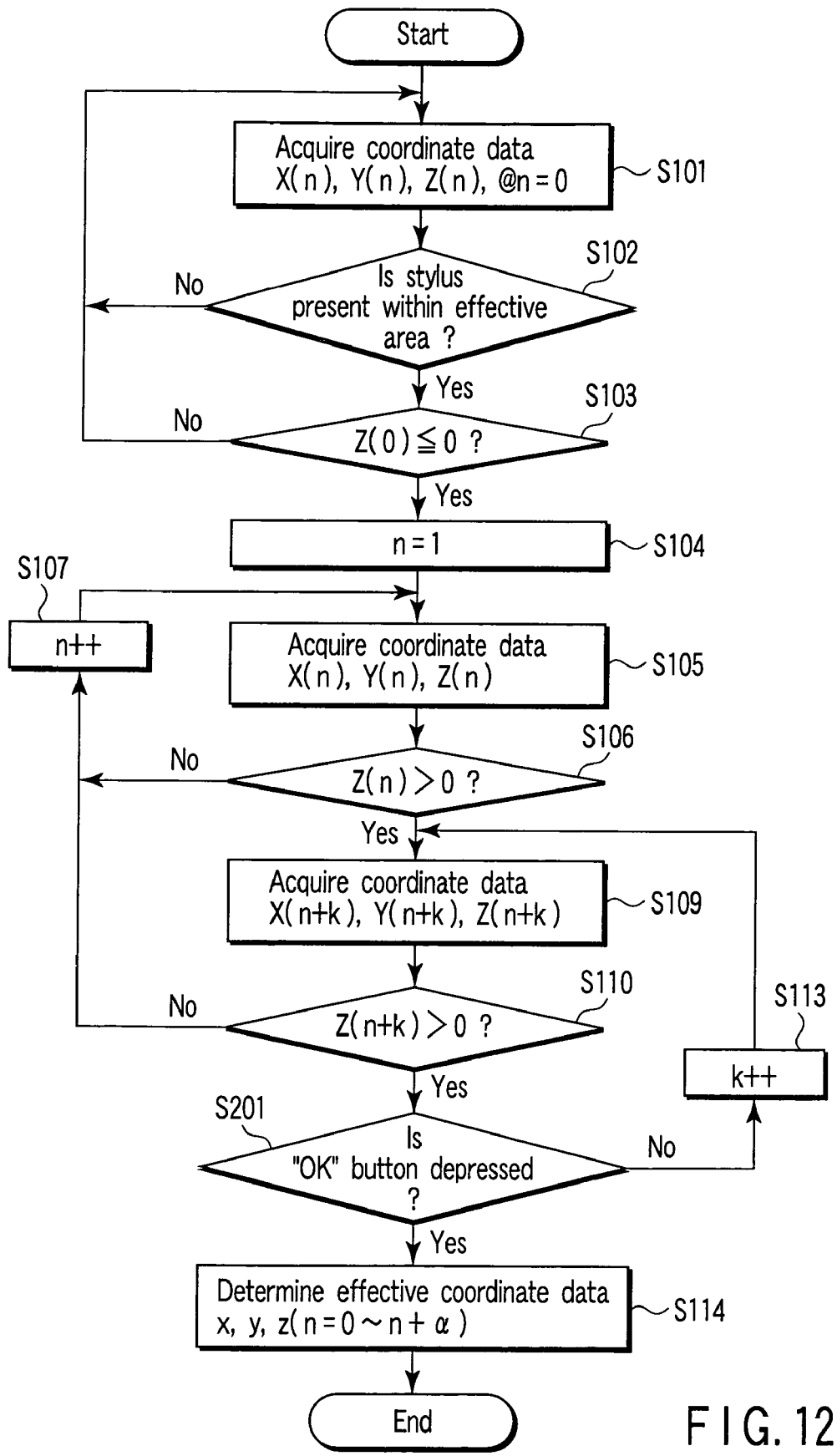
FIG. 12 is a flowchart showing another procedure of a signature input operation performed by the computer shown in FIG. 1.

The steps S108 and S111 shown in FIG. 11 are omitted from the flowchart shown in FIG. 12. The step S112 shown in FIG. 11 is replaced with a step S201 shown in FIG. 12. Except for these, the flowchart of FIG. 12 is the same as that of FIG. 11.

In step S201, the CPU 101 determines whether the "OK" button 202 on the signature enrollment screen 200 in FIG. 4 or the "OK" button 302 on the signature verification screen 300 in FIG. 5 is depressed by the stylus 10. When the "OK" button 202 or 302 is depressed, the CPU 101 determines that the input of a handwritten signature is completed and performs the operation of step S114 described above.

In the signature input operation according to the embodiment of the present invention, not only a string of coordinate-data and a string of pressure-data acquired from the signature input start point to the final actual stroke end point, but also coordinate data and pressure data corresponding to a given number of samples acquired after the final actual stroke end point is defined as signature data. More characteristic data can thus be obtained from the handwritten signature. Moreover, the coordinate data and pressure data corresponding to a given number of samples is air stroke information acquired immediately after the final actual stroke ends. Therefore, even though the third party tries to copy a user's signature, he or she cannot reproduce its air stroke obtained immediately after the final actual stroke ends. It is thus possible to determine whether a user's own signature is correct or not with high accuracy.

Since the signature input operation according to the present embodiment is achieved by computer programs, the same advantages as those of the present embodiment can easily be obtained simply by installing the computer programs into a normal computer through a computer-storage medium.

In the above embodiment, four items of coordinate data (X, Y, Z) obtained immediately after the final actual stroke end point are used as effective air stroke data. However, the number of items of coordinate data (X, Y, Z) can appropriately be varied in consideration of the characteristics of the digitizer and the like. Moreover, the number of items of coordinate data (X, Y, Z) to be used as the effective air stroke can be determined based on the characteristics of six signatures handwritten at the time of signature enrollment.

Since the effective air stroke data has only to represent the movement of the stylus 10 in the air immediately after the final actual stroke end point, only the string of coordinate data (X, Y) obtained immediately after the final actual stroke end point can be used as effective air stroke data and the string of pressure data (Z) obtained immediately after the final actual stroke end point can be deleted. In this case, information to determine which data in the signature data is air stroke data obtained immediately after the final actual stroke can be added to the signature data.

In the present embodiment, the digitizer is formed integrally with the display device as one unit. However, they need not always be formed as one unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
   an input device which inputs coordinate data and pressure data corresponding to a signature which is handwritten by a stylus;
   a determining unit configured to determine whether the stylus lifts off the input device, based on the pressure data input by the input device;
   a sensing unit configured to sense a completion of input of a handwritten signature when a lift-off state of the stylus continues for a given period of time;
   a detecting unit configured to detect an actual stroke end point at which the stylus contacts the input device last, when the completion of input of the handwritten signature is sensed;
   an extracting unit configured to extract a given number of items of coordinate data input after the actual stroke end point, as effective air stroke data after the actual stroke end point, from the coordinate data and pressure data both input during a period of time from the actual stroke end point to sensing of the completion of input of the handwritten signature; and
   a defining unit configured to defines, as signature data corresponding to the handwritten signature, the coordinate data and the pressure data both input during a period of time from a signature input start point at which the stylus contacts the input device first to the actual stroke end point and the coordinate data extracted as the effective air stroke data.

2. The information processing apparatus according to claim 1, wherein the extracting unit includes a unit which extracts, as the effective air stroke data, the coordinate data and the pressure data both input during the given period of time after the actual stroke end point.

3. The information processing apparatus according to claim 1, further comprising a verifying unit configured to verify whether the handwritten signature is valid by comparing the defined signature data with signature data stored in advance in a storage device in the information processing apparatus.

4. An information processing apparatus comprising:
   an input device which inputs coordinate data and pressure data corresponding to a signature which is handwritten by a stylus;
   a button which inputs data indicating that a handwritten signature has been input to the input device;
   a sensing unit configured to sense a completion of input of the handwritten signature in response to the data input from the button;
   a detecting unit configured to detect an actual stroke end point at which the stylus contacts the input device last, when the completion of input of the handwritten signature is sensed;
   an extracting unit configured to extract a given number of items of coordinate data input after the actual stroke end point, as effective air stroke data after the actual stroke end point, from the coordinate data and pressure data both input during a period of time from the actual stroke end point to sensing of the completion of input of the handwritten signature; and
   a defining unit configured to defines, as signature data corresponding to the handwritten signature, the coordinate data and the pressure data both input during a period of time from a signature input start point at which the stylus contacts the input device first to the actual stroke end point and the coordinate data extracted as the effective air stroke data.

5. The information processing apparatus according to claim 4, wherein the extracting unit includes a unit which extracts, as the effective air stroke data, the coordinate data and the pressure data both input during the given period of time after the actual stroke end point.

6. The information processing apparatus according to claim 4, further comprising a verifying unit configured to verify whether the handwritten signature is valid by comparing the defined signature data with signature data stored in advance in a storage device in the information processing apparatus.

7. A program stored in a computer-readable medium and causing a computer to input signature data, the computer including an input device which inputs coordinate data and pressure data corresponding to a signature which is handwritten by a stylus, the program comprising:
   causing the computer to perform an operation of determining whether the stylus lifts off the input device, based on the pressure data input by the input device;
   causing the computer to perform an operation of sensing a completion of input of the handwritten signature when a lift-off state of the stylus continues for a given period of time;
   causing the computer to perform an operation of detecting an actual stroke end point at which the stylus contacts the input device last, when the completion of input of the handwritten signature is sensed;
   causing the computer to perform an operation of extracting a given number of items of coordinate data input after the actual stroke end point, as effective air stroke data after the actual stroke end point, from the coordinate data and pressure data both input during a period of time from the actual stroke end point to sensing of the completion of input of the handwritten signature; and causing the computer to perform an operation of defining, as signature data corresponding to the handwritten signature, the coordinate data and the pressure data both input during a period of time from a signature input start point at which the stylus contacts the input device first to the actual stroke end point and the coordinate data extracted as the effective air stroke data.

8. The program according to claim 7, wherein the extracting operation includes an operation of extracting, as the effective air stroke data, the coordinate data and the pressure data both input during the given period of time after the actual stroke end point.

9. The program according to claim 7, further comprising causing the computer to perform an operation of verifying whether the handwritten signature is valid by comparing the defined signature data with signature data stored in advance in a storage device in the computer.

10. A program stored in a computer-readable medium and causing a computer to input signature data, the computer including an input device which inputs coordinate data and pressure data corresponding to a signature which is handwritten by a stylus, the program comprising:

causing the computer to perform an operation of sensing a completion of input of a handwritten signature in response to an operation of a button to input data indicating a completion of input of the handwritten signature;

causing the computer to perform an operation of detecting an actual stroke end point at which the stylus contacts the input device last, when the completion of input of the handwritten signature is sensed;

causing the computer to perform an operation of extracting a given number of items of coordinate data input after the actual stroke end point, as effective air stroke data after the actual stroke end point, from the coordinate data and pressure data both input during a period of time from the actual stroke end point to sensing of the completion of input of the handwritten signature; and causing the computer to perform an operation of defining, as signature data corresponding to the handwritten signature, the coordinate data and the pressure data both input during a period of time from a signature input start point at which the stylus contacts the input device first to the actual stroke end point and the coordinate data extracted as the effective air stroke data.

11. The program according to claim 10, wherein the extracting operation includes an operation of extracting, as the effective air stroke data, the coordinate data and the pressure data both input during the given period of time after the actual stroke end point.

12. The program according to claim 10, further comprising causing the computer to perform an operation of verifying whether the handwritten signature is valid by comparing the defined signature data with signature data stored in advance in a storage device in the computer.

13. A method of inputting signature data corresponding to a signature which is handwritten to an input device of an information processing apparatus, the input device inputting coordinate data and pressure data corresponding to the signature which is handwritten by a stylus, the method comprising:

determining whether the stylus lifts off the input device, based on the pressure data input by the input device;

sensing a completion of input of a handwritten signature when a lift-off state of the stylus continues for a given period of time;

detecting an actual stroke end point at which the stylus contacts the input device last, when the completion of input of the handwritten signature is sensed;

extracting a given number of items of coordinate data input after the actual stroke end point, as effective air stroke data after the actual stroke end point, from the coordinate data and pressure data both input during a period of time from the actual stroke end point to sensing of the completion of input of the handwritten signature; and defining, as signature data corresponding to the handwritten signature, the coordinate data and the pressure data both input during a period of time from a signature input start point at which the stylus contacts the input device first to the actual stroke end point and the coordinate data extracted as the effective air stroke data.

14. The method according to claim 13, wherein the extracting includes extracting, as the effective air stroke data, the coordinate data and the pressure data both input during the given period of time after the actual stroke end point.

15. The method according to claim 13, further comprising verifying whether the handwritten signature is valid by comparing the defined signature data with signature data stored in advance in a storage device in the information processing apparatus.

16. A method of inputting signature data corresponding to a signature which is handwritten to an input device of an information processing apparatus, the input device inputting coordinate data and pressure data corresponding to the signature which is handwritten by a stylus, the method comprising:

sensing a completion of input of a handwritten signature in response to an operation of a button to input data indicating a completion of input of the handwritten signature;

detecting an actual stroke end point at which the stylus contacts the input device last, when the completion of input of the handwritten signature is sensed;

extracting a given number of items of coordinate data input after the actual stroke end point, as effective air stroke data after the actual stroke end point, from the coordinate data and pressure data both input during a period of time from the actual stroke end point to sensing of the completion of input of the handwritten signature; and defining, as signature data corresponding to the handwritten signature, the coordinate data and the pressure data both input during a period of time from a signature input start point at which the stylus contacts the input device first to the actual stroke end point and the coordinate data extracted as the effective air stroke data.

17. The method according to claim 16, wherein the extracting includes extracting, as the effective air stroke data, the coordinate data and the pressure data both input during the given period of time after the actual stroke end point.

18. The method according to claim 16, further comprising verifying whether the handwritten signature is valid by comparing the defined signature data with signature data stored in advance in a storage device in the information processing apparatus.

* * * * *